United States Patent Office 3,401,777
Patented Sept. 17, 1968

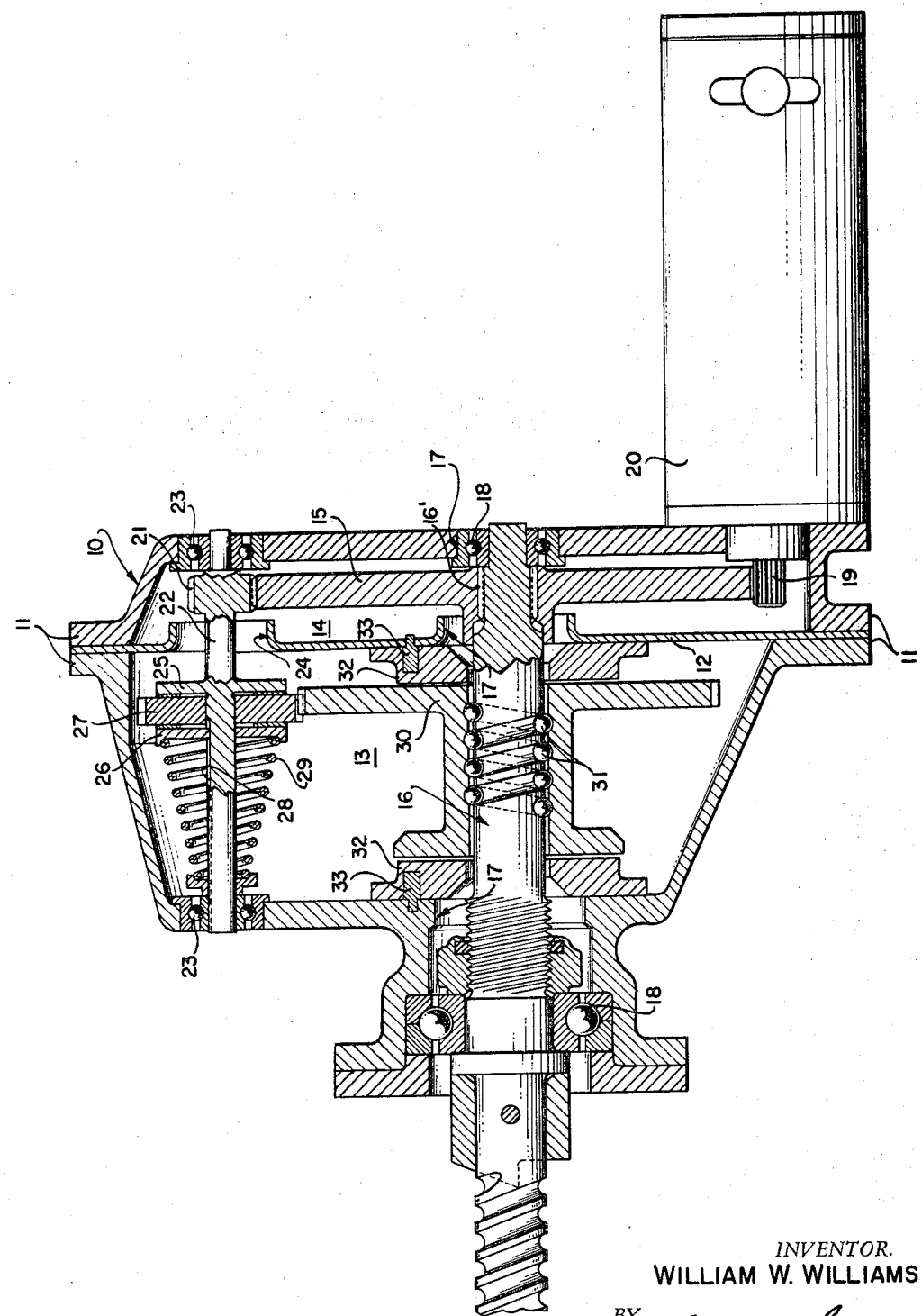

3,401,777
BI-DIRECTIONAL NO-BACK COUPLING
William W. Williams, Atlanta, Ga., assignor to Lockheed Aircraft Corporation, Burbank, Calif.
Filed July 28, 1966, Ser. No. 568,661
5 Claims. (Cl. 192—8)

ABSTRACT OF THE DISCLOSURE

This device employs clutch, gear, spline, ball nut and ball screw elements to prevent the tractive effort of a driven load from feeding back to the prime mover or motor. When the device is holding against an opposing torque on the output shaft, none of the output shaft torque feeds back through the device to the prime mover. When the device is driving or holding a torque on the output shaft which is in a direction to aid the output shaft rotation, it prevents the aiding torque on the output shaft from exerting any torque at the prime mover or motor shaft. In this case, the output aiding torque will not cause the motor to over-speed when running and it will not cause the motor shaft to turn when the motor is stopped.

---

This invention relates in general to couplings and more particularly to a coupling adapted to connect a driven member to a bi-directional drive mechanism therefor whereby reverse loads, i.e., external loads or forces acting on the driven member are absorbed within the coupling rather than transmitted into the drive mechanism.

The present invention has general application and utility wherever it is desired to prevent an actuated load from back-driving the actuating device. For example, the actuators employed to operate the external control surfaces of aircraft must overcome aerodynamic loading on the surfaces in order to steer and manuever the aircraft and yet be irreversible lest back loads from the control surfaces damage the actuator mechanism. The alternative of dual actuators cannot be tolerated because of space, weight and power restrictions.

Heretofore, efforts to make such actuators irreversible have resulted in so-called overrunning clutches which essentially unlock or disconnect the driven from the drive member upon the onset of reverse loads. The same effect has also been accomplished by locking means normally securing the driven member against movement and release means responsive to the initial operation of the drive to disengage the locking means whereby the driven member is moved only by the drive. In either case, such devices employ mechanical elements that in substance rely on a "wheel and chock" type of action, such as sprags, roller-and-eccentric, etc., and have proven unsatisfactory primarily because they set up vibration or chatter when driving with aiding loads and because they tend to jam or bind when holding against back-driving loads under vibration.

The instant invention contemplates improvements in the irreversible actuator art by the provision of a coupling to interconnect the drive and driven members in direct and constant engagement that incorporates gearing and a clutch, limiting movement of the driven member in either direction to movement by forces applied adjacent one end thereof. Thus, the coupling herein proposed effectively includes spaced engagement members directly engagable with the drive and driven members respectively through gearing and an associated clutch whereby an applied force by the drive moves the engagement members at one speed relative to the clutch while an applied force by the driven member moves the engagement members at another speed relative to the clutch. At the first speed, the driven member is never connected by the engagement members so as to become locked thereby, and the drive is effective in moving the driven member. On the other hand, at the other relative speed, the driven member is connected or locked by the engagement members and thereafter is ineffective on the drive mechanism.

With the above and other objects in view as will be apparent, this invention consists in the construction, combination and arrangement of parts all as hereinafter more fully described, claimed, and illustrated in the accompanying drawing wherein is shown a transverse section of a coupling as herein proposed.

Referring more particularly to the drawing, 10 designates a housing made in two parts each provided with a flange 11 through which the housing halves are adapted to be interconnected by suitable connection means into a unitary assembly. Sandwiched between the flanges 11 is a transverse wall 12 which divides the interior of the housing 10 into chambers 13 and 14. A bullgear 15 is mounted within the chamber 14 on a shaft 16 through a spline connection 16'. This shaft 16 extends through the housing 10 passing through aligned openings 17 which pierce the walls of the housing 10 and wall 12. Suitable antifriction means, such as ball bearings 18, are provided in the opposed end walls of the housing 10 following conventional practice in which the shaft 16 is mounted for free and unrestricted rotation.

Also mounted within the chamber 14 is a drive shaft 19 engaged in constant mesh with the bullgear 15. The shaft 19 is driven by a reversible motor 20 which may be mounted externally of the housing 10.

Also mounted within the chamber 14 and in constant mesh with the bullgear 15 is a pinion 21. The pinion 21 constitutes an integral part of a countershaft 22 disposed across the housing 10 substantially parallel to shaft 16 being rotatably mounted at each of its ends, as at 23, in the opposed housing walls. The wall 12 is pierced by an opening 24 to permit passage of the countershaft 22 therethrough.

Mounted on the countershaft 22 and disposed within the chamber 13 is an integral friction disc 25 and an opposing friction disc 26 between the surfaces of which a nut drive gear 27 is disposed. The countershaft 22 is splined, as at 28, whereby the nut drive gear 27 and opposing friction disc 26 are slidable thereon. Friction disc 26 is spring loaded as by a compression spring 29 to normally apply a force in the direction of disc 25 whereby a torsional restraint is exerted by the friction discs 25 and 26 on the nut drive gear 27. This mechanism constitutes what may be fairly termed a constantly engaged, slippable clutch.

The teeth of gear 27 are in mesh with teeth formed on the outer surface of a nut 30 mounted on the shaft 16 within chamber 13. The associated section of the shaft 16 is threaded for coaction with the nut 30 and in which balls operate constituting a conventional ball screw 31. The remote faces of the nut 30 are sufficiently enlarged for coaction with friction plates 32 fixedly secured to and carried by the adjacent surfaces of the housing wall 10 and transverse wall 12 in any appropriate manner as indicated by the pins 33.

In view of the foregoing construction and arrangement, operation of the motor 20 in either direction serves to drive the shaft 16 and the connected load accordingly through the bullgear 15. The bullgear 15 concurrently drives the pinion 21, and due to a predetermined lost motion provided in the spline connection 16', the pinion 21 rotates in advance of the shaft 16 unless the shaft 16 has been moved to take up this lost motion by an aiding load, i.e., a load in the same direction of the operating motor 20. Due to the gear ratio of pinion 21 to the nut drive gear 27 (the pinion 21 has less teeth than the gear 27), the nut 30 disengages the associated friction plate or brake 32 permitting the shaft 16 to rotate without restriction while the nut 30 ineffectively moves linearly therealong. If and when the nut 30 engages the opposite friction plate or brake 32 causing it to rotate at the slower speed of the shaft 16, the nut drive gear 27 is permitted to assume the same slower speed due to its frictional connection at 25 and 26 on the countershaft 22. Thus, gear 27 is allowed to slip and continued rotation of the pinion by operation of the motor 20 is now ineffective on the gear 27 and nut 30.

If the motor 20 is stopped after driving the output shaft 16 in one direction, for example clockwise, with an opposing, i.e., counterclockwise torque load, the nut 30 has also been revolving clockwise. However, the gear ratio between pinion 21 and the nut drive gear 27 causes the nut 30 to try to revolve faster than the output shaft 16. This causes the nut 30 to move to the left along the screw section of the shaft 16 contacting the left friction plate 32. At this point continued rotation of the bullgear 15 and the countershaft elements cause the nut drive gear 27 to slip between its driving friction discs 25 and 26 maintaining a torque on nut 30 and hence an axial force by nut 30 on the left friction plate 32. In this condition if the drive motor 20 is stopped and the opposing counterclockwise load torque is still applied to the output shaft 16, the ball screw 31 tightens the nut 30 harder against the left friction plate 32 thus preventing rotation of the output shaft 16. Since lost motion is provided by the splines 16' between the bullgear 15 and the output shaft 16, a reversal of direction in the above operation would also cause locking of the output shaft 16 against load reversal of direction by moving the nut 30 against the right friction plate 32.

In the first instance, if the load is applying a clockwise torque to the output shaft 16 when the motor 20 is stopped, the shaft 16 will rotate clockwise until the nut 30 has moved to the right along the ball screw 31 to contact the right friction plate 32, thus locking the output shaft 16. The play between the bullgear 15 and output shaft 16 provided by the splines 16' is sufficient to permit this action.

While the foregoing disclosure is directed to a preferred embodiment of the invention, it will be obvious to those skilled in the art that various changes and modifications thereof are possible without departing from the true spirit and scope of the invention. The appended claims are therefore intended to cover all such modifications and define the sole limitations of the invention.

What is claimed is:

1. A bi-directional no-back coupling adapted to connect a driven member to a bi-directional drive comprising:
   a pair of spaced rotary members one connected to said driven member and one connected to said drive;
   a first gear connecting said rotary members;
   a frictional engagement between said first gear and the rotary member connected to said driven member; and
   a clutch between said first gear and said frictional engagement operative in response to an applied force in either direction by said drive to render said frictional engagement ineffective whereby the driven member is rotated by the drive through said first gear and operative in response to an applied force in either direction by said driven member to render said frictional engagement effective whereby the driven member is disconnected from the drive through said first gear for independent relative rotation.

2. The coupling of claim 1 wherein the rotary member connected to said driven member is a shaft and said first gear and said frictional engagement are interconnected by a second gear mounted on said shaft and linearly movable thereon upon rotation in each direction to effect said frictional engagement at opposite ends of its travel, a countershaft, a pinion gear on said countershaft disposed in constant engagement with the first gear aforesaid and a drive gear on said countershaft disposed in constant engagement with the linearly movable gear aforesaid and engageable with and releasable from said countershaft by operation of said clutch as aforesaid.

3. The coupling of claim 2 including a lost motion between said keyed gear and said shaft.

4. The coupling of claim 2 wherein said shaft is a ball screw and the linearly movable gear aforesaid is a nut coacting with said ball screw.

5. The coupling of claim 1 wherein said first gear includes a predetermined lost motion whereby a relative change in direction between said rotary members results in the delayed effectivity of said first gear.

References Cited

UNITED STATES PATENTS

| 2,927,551 | 3/1960 | Bevis et al. | 192—8 |
| 2,372,026 | 3/1945 | Smith | 192—8 |
| 2,653,691 | 9/1953 | Weiland | 192—8 |
| 2,659,466 | 11/1953 | Ochtman | 192—8 |

MARTIN P. SCHWADRON, *Primary Examiner.*

C. LEEDOM, *Assistant Examiner.*